United States Patent
Nojima

(10) Patent No.: US 8,369,046 B2
(45) Date of Patent: Feb. 5, 2013

(54) DISK DRIVE SUSPENSION HAVING A RECESS IN A LOAD BEAM OR BASEPLATE TO CONTAIN DAMPING MATERIAL, AND A LID PORTION FOR THE RECESS FORMED BY A PLATE-LIKE CONSTITUENT MEMBER OF THE SUSPENSION

(75) Inventor: Akira Nojima, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 361 days.

(21) Appl. No.: 12/766,043

(22) Filed: Apr. 23, 2010

(65) Prior Publication Data

US 2010/0277834 A1 Nov. 4, 2010

(30) Foreign Application Priority Data

Apr. 30, 2009 (JP) ................................. 2009-111329

(51) Int. Cl.
*G11B 5/55* (2006.01)
(52) U.S. Cl. ................................. 360/244.2; 360/264.1
(58) Field of Classification Search .... 360/264.1–266.1, 360/244.2–245.2
See application file for complete search history.

(56) References Cited

U.S. PATENT DOCUMENTS

| | | | |
|---|---|---|---|
| 6,005,750 A | 12/1999 | Willard et al. | |
| 6,147,831 A * | 11/2000 | Kennedy et al. | 360/75 |
| 6,271,996 B1 * | 8/2001 | Houk et al. | 360/244.9 |
| 6,297,933 B1 | 10/2001 | Khan et al. | |
| 6,937,444 B1 * | 8/2005 | Oveyssi | 360/265.8 |
| 7,929,254 B2 * | 4/2011 | Soga et al. | 360/266 |
| 8,070,907 B2 * | 12/2011 | Tanaka | 156/272.8 |
| 2008/0158725 A1 * | 7/2008 | Hirano et al. | 360/86 |

FOREIGN PATENT DOCUMENTS

| | | |
|---|---|---|
| CN | 1582471 A | 2/2005 |
| JP | 9-91909 A | 4/1997 |

OTHER PUBLICATIONS

Chinese Office Action dated Jul. 19, 2011 (and English translation thereof) in counterpart Chinese Application No. 201010174845.4.

* cited by examiner

*Primary Examiner* — Allen Heinz
(74) *Attorney, Agent, or Firm* — Holtz, Holtz, Goodman & Chick, PC

(57) ABSTRACT

In a disk drive suspension including a baseplate, a load beam, and a flexure, the suspension comprises a recess formed in one surface of the load beam relative to the thickness thereof, a damping material contained in the recess, and a lid portion superposed on the damping material so as to cover at least a part of the recess. The lid portion is formed of a part of a flexure. The flexure is an example of a suspension constituent member.

3 Claims, 6 Drawing Sheets

DISK DRIVE SUSPENSION HAVING A RECESS IN A LOAD BEAM OR BASEPLATE TO CONTAIN DAMPING MATERIAL, AND A LID PORTION FOR THE RECESS FORMED BY A PLATE-LIKE CONSTITUENT MEMBER OF THE SUSPENSION

CROSS-REFERENCE TO RELATED APPLICATIONS

This application is based upon and claims the benefit of priority from prior Japanese Patent Application No. 2009-111329, filed Apr. 30, 2009, the entire contents of which are incorporated herein by reference.

BACKGROUND OF THE INVENTION

1. Field of the Invention

The present invention relates to a disk drive suspension with a damping material and a manufacturing method therefor.

2. Description of the Related Art

A disk drive suspension is used in a hard disk drive (HDD) for recording and reproducing data to and from a rotating disk.

The disk drive suspension comprises a load beam, flexure, etc. The load beam is fixed to a carriage through a baseplate. The flexure is superposed on the load beam. A slider is mounted on a tongue portion formed on the flexure. A reading or writing element (transducer) is disposed on the slider. In some cases, a springy hinge member may be provided between the baseplate and load beam.

A damper, such as the one disclosed in Jpn. Pat. Appln. KOKAI Publication No. 9-91909, is used to improve the resonance and other dynamic properties of the suspension. The damper has a laminated structure consisting of a viscoelastic body and a constraint plate of a metal or the like. The damper is affixed to a flat surface, e.g., the central part of the suspension.

In affixing the damper to, for example, the load beam, the viscoelastic body of the damper is pressed against a surface of the load beam. Thereupon, the damper is fixed to the load beam by the adhesion of the viscoelastic body. Since the load beam is a very thin member, however, it may sometimes be deformed by a force with which the damper is affixed to it.

The static properties and the resonance and other dynamic properties of the suspension change if the load beam is deformed. Consequently, the static and dynamic properties of the manufactured suspension vary inevitably.

Since the damper is affixed to the load beam relative to its thickness, moreover, the thickness of the damper is added to that of the load beam. Therefore, the thickness of the entire suspension is increased, and in addition, the weight of the suspension is inevitably increased by the mass of the damper. Further, high positioning accuracy is required in order to affix the damper in a predetermined position on the suspension. Thus, affixing the damper to the suspension requires use of a special affixing machine that ensures high positioning accuracy.

BRIEF SUMMARY OF THE INVENTION

The present invention provides a disk drive suspension with a lightweight vibration damping structure, configured so that a damper can be easily mounted in a predetermined position on a load beam and the load beam can be prevented from being deformed when the damper is mounted thereon and a manufacturing method therefor.

The present invention is a disk drive suspension comprising a baseplate and a load beam. The suspension comprises a recess formed in one surface of the load beam relative to the thickness thereof, a damping material contained in the recess, and a lid portion superposed on the damping material so as to cover at least a part of the recess. The lid portion is formed of a part of a plate-like suspension constituent member. The plate-like suspension constituent member is, for example, a flexure or hinge member.

In a disk drive suspension according to another aspect of the invention, the recess is formed in one surface of the baseplate relative to the thickness thereof.

A manufacturing method for a disk drive suspension of the invention comprises a step of forming a recess in one surface of a load beam relative to the thickness thereof, a step of putting a damping material into the recess, a step of superposing a lid portion, formed of a part of a flexure, on the damping material, thereby holding the damping material, and a step of fixing the flexure to the load beam.

In a preferred form of the invention, the step of forming the recess is performed by coining, a kind of press forming. In another form, the step of forming the recess is performed by partial etching.

According to the disk drive suspension with the damping material of the invention, the viscoelastic body or other damping material is contained in the recess formed in the load beam. Therefore, the damping material can be easily located in a predetermined position on the load beam. Further, the damping material contained in the recess can be held by a plate-like member, such as the flexure, which doubles as a constraint plate. Thus, a force with which the damping material is mounted on the load beam can be reduced, so that deformation of the load beam can be prevented. Since the damping material is contained in the recess in the load beam, moreover, the increase in weight of the suspension can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 5.

Figure 1:
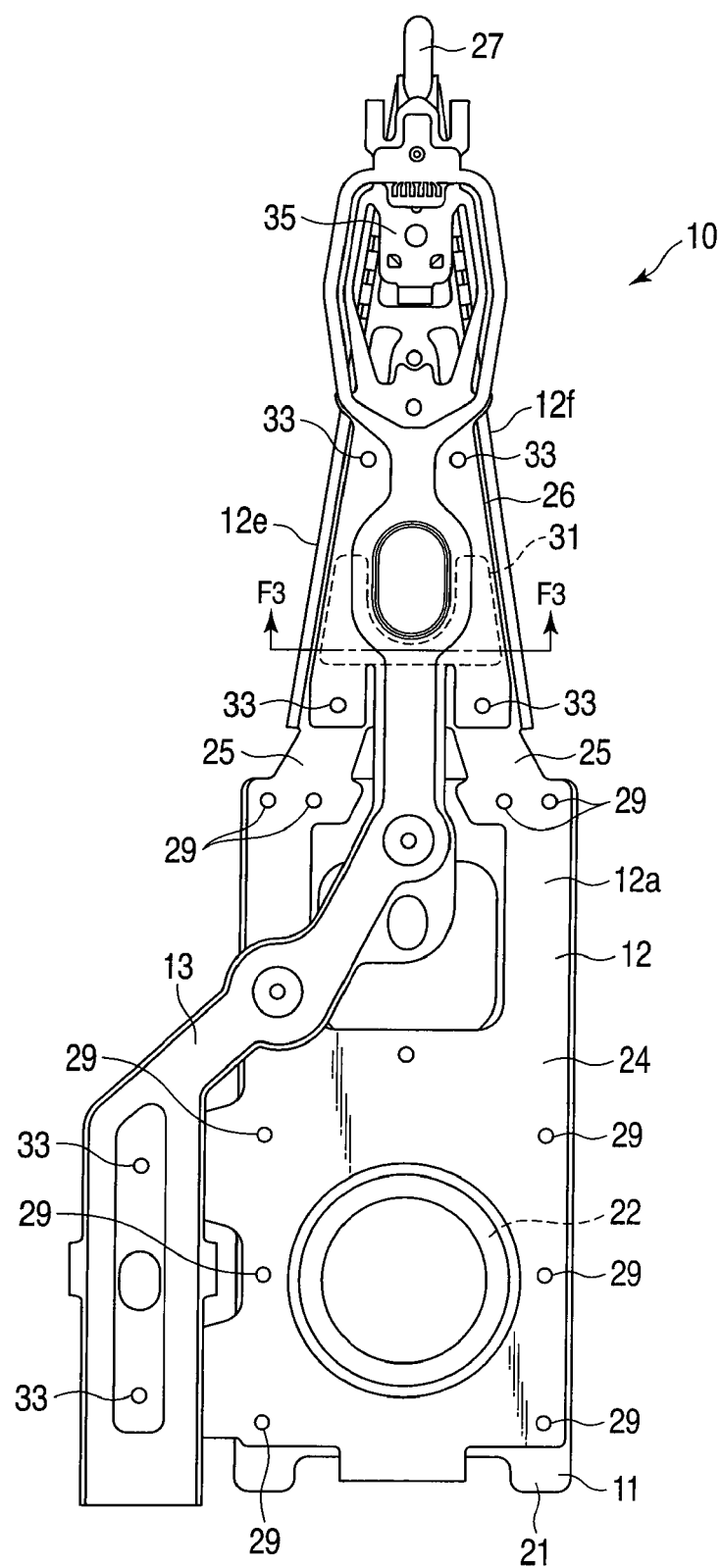
FIG. 1 is a plan view of a suspension according to a first embodiment of the invention.

FIG. 1 shows an example of a disk drive suspension (hereinafter simply referred to as a "suspension") 10.

The suspension 10 comprises suspension constituent members, such as a baseplate 11, load beam 12, flexure 13, etc. The flexure 13 functions as a plate-like suspension constituent member according to the present invention.

The baseplate 11 is formed of a metal such as stainless steel. The baseplate 11 is a plate-like member with a thickness of, for example, 150 to 200 µm. The baseplate 11 comprises a flat plate portion 21, cylindrical boss portion 22, etc. The boss portion 22 protrudes from one surface of the plate portion 21. The boss portion 22 is fixed to, for example, a carriage arm (not shown).

Figure 2:
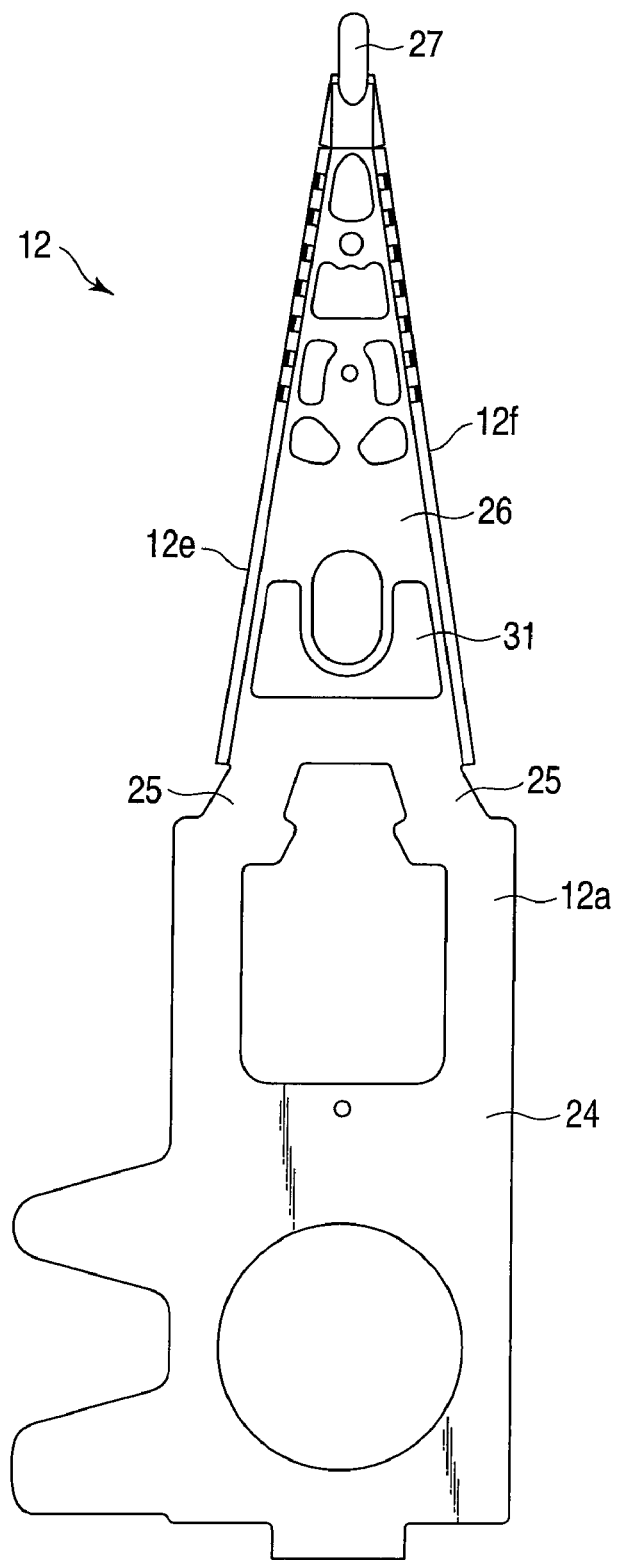
FIG. 2 is a plan view of a load beam of the suspension shown in FIG. 1.

FIG. 2 shows an example of the load beam 12. The load beam 12 is a thin plate spring with a thickness of, for example, about 5 to 100 µm. The load beam 12 is formed of a metal such as stainless steel. The load beam 12 comprises a proximal portion 24, hinge portions 25, beam portion 26, and distal end portion 27. The flexure 13 is located on one surface 12a of the load beam 12 relative to its thickness, and the baseplate 11 on the other surface 12b.

The other surface 12b of the proximal portion 24 of the load beam 12 is superposed on the baseplate 11. The proximal portion 24 comprises a plurality of welded joints 29. The welded joints 29 are fixed to the baseplate 11 by fixing means, such as laser welding. The hinge portions 25 are formed near the baseplate 11. The hinge portions 25 can bend relative to the thickness of the load beam 12. The beam portion 26 is formed halfway between the distal end portion 27 and hinge portions 25 longitudinally relative to the portions 25 and 27.

The one surface 12a of the load beam 12 is formed with a recess 31. The recess 31 is recessed inwardly relative to the thickness of the load beam 12. In the present embodiment, the recess 31 is disposed at the beam portion 26 and located in the middle of the load beam 12 longitudinally relative to the load beam 12.

The flexure 13 shown in FIG. 1 is superposed on the one surface 12a of the load beam 12. The flexure 13 is, for example, a stainless-steel plate thinner than the load beam 12. The flexure 13 is springy and, for example, about 15 to 25 µm thick. The flexure 13 comprises a plurality of welded joints 33. The welded joints 33 are fixed to the load beam 12 by fixing means, such as laser welding.

A tongue portion (gimbal portion) 35 is formed near the distal end of the flexure 13. A slider (not shown), which functions as a magnetic head, is mounted on the tongue portion 35. The flexure 13 comprises a lid portion 38 opposed to the one surface 12a of the load beam 12. The lid portion 38 is a flat surface formed on a part of the flexure 13. The lid portion 38 is located covering the entire opening of the recess 31.

Figure 3:
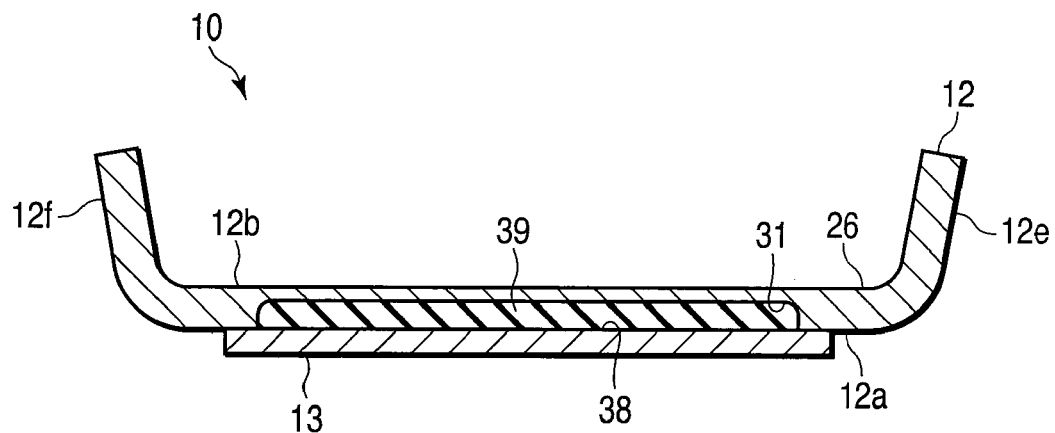
FIG. 3 is a sectional view of the suspension taken along line F3-F3 of FIG. 1.

FIG. 3 is a sectional view of the suspension 10 taken along line F3-F3 of FIG. 1. A viscoelastic body 39 is contained in the recess 31. The viscoelastic body 39 functions as a damping material according to the present invention. The viscoelastic body 39 is a high polymer material having viscosity, elasticity, and fluidity. The viscoelastic body 39 displays a viscous resistance corresponding to the degree of its deformation. For example, an acrylic resin is used for the viscoelastic body 39.

The lid portion 38 of the flexure 13 is superposed on the viscoelastic body 39 so as to cover the entire opening of the recess 31. Thus, the viscoelastic body 39, having viscosity, adheres to the lid portion 38 and the inner surface of the recess 31 when it is held in a predetermined position on the load beam 12.

The following is a description of a method for manufacturing the suspension 10 constructed in this manner.

Figure 4:
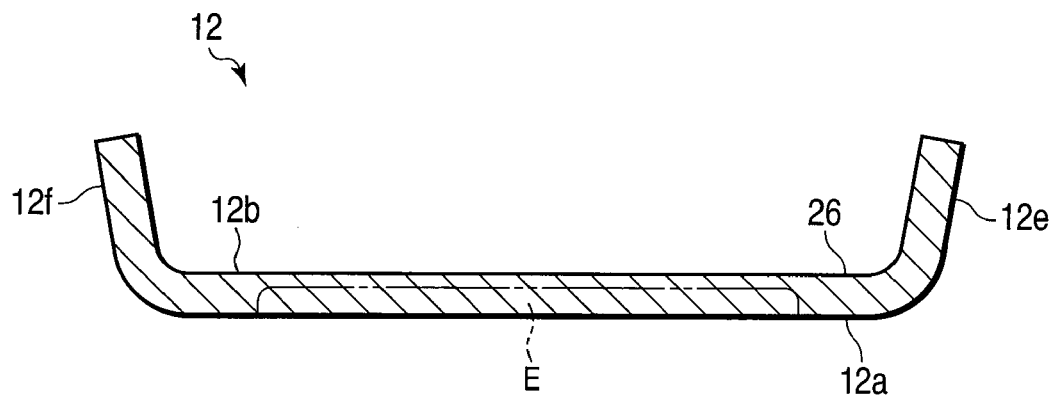
FIG. 4 is a sectional view of the load beam before the formation of a recess.

FIG. 4 is a sectional view showing the load beam 12 in the position shown in the sectional view of FIG. 3 before the recess 31 is formed. A region E of the load beam 12 is dissolved by, for example, partial etching. The region E is a part of the load beam 12 relative to its thickness and is enclosed by a two-dot chain line in FIG. 4. If the region E is dissolved, the recess 31 is formed in the one surface 12a of the load beam 12. After the recess 31 is formed, bent portions 12e and 12f are press-formed on the load beam 12.

The method of forming the recess 31 in the load beam 12 is not limited to partial etching, and may alternatively be, for example, coining, a kind of press forming. In forming the recess 31 by coining, the recess 31 may be formed before or after the load beam 12 is press-formed. Further, the recess 31 may be formed simultaneously with the load beam 12.

Figure 5:
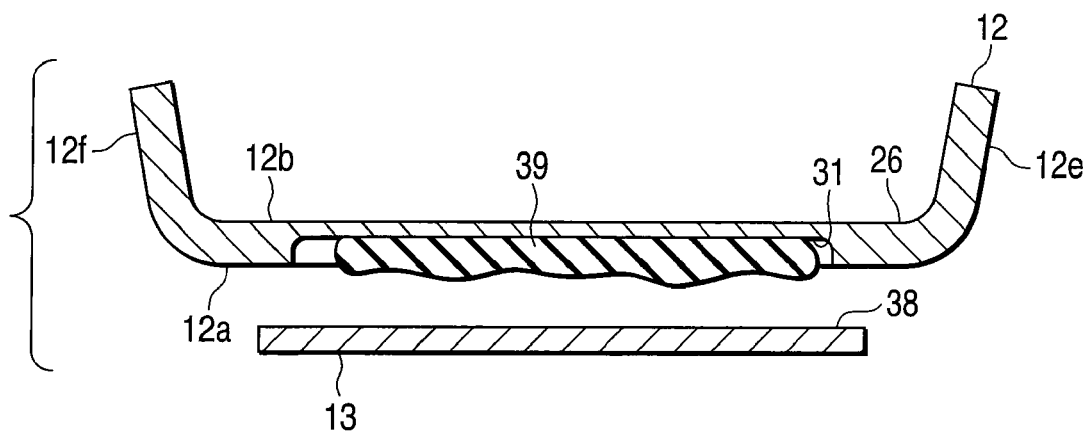
FIG. 5 is a sectional view showing a state before a flexure is fixed to the load beam shown in FIG. 1.

FIG. 5 is a sectional view showing the load beam 12, flexure 13, and viscoelastic body 39 in the position shown in the sectional view of FIG. 3 before the suspension 10 is assembled. The recess 31 is formed in the one surface 12a of the load beam 12 by, for example, partial etching. The viscoelastic body 39 is contained in the recess 31.

A sufficient amount of the viscoelastic body 39 to fill the recess 31 is fed into the recess 31 through a nozzle (not shown), for example. Since the viscoelastic body 39 is viscous, it adheres to the inner surface of the recess 31 when it is fed into the recess 31. Since the viscoelastic body 39 is fluid, it diffuses into the recess 31, as shown in FIG. 5.

After the viscoelastic body 39 is contained in the recess 31, the flexure 13 is superposed on the one surface 12a of the load beam 12 in the direction of arrow A in FIG. 5. When this is done, the lid portion 38, a part of the flexure 13, is superposed on the viscoelastic body 39.

As the lid portion 38 is superposed on the viscoelastic body 39, the latter is pressed by the former. Thereupon, the fluid viscoelastic body 39 further diffuses into the recess 31. As shown in FIG. 3, the recess 31 adheres to substantially the entire area of the inner surface of the recess 31 and also to the lid portion 38. Thus, the viscoelastic body 39 is held surrounded by the lid portion 38 and the inner surface of the recess 31.

After the viscoelastic body 39 is held between the load beam 12 and flexure 13, the flexure 13 is fixed to the one surface 12a of the load beam 12. The welded joints 33 of the flexure 13 are fixed to the load beam 12 by fixing means, such as laser welding.

According to the manufacturing processes described above, the suspension 10 can acquire a vibration damping structure with the viscoelastic body 39 contained in the recess 31 and with the lid portion 38, a part of the flexure 13, superposed on the viscoelastic body 39. Accordingly, a force that acts on the suspension 10 as the viscoelastic body 39 is disposed in position can be reduced compared to the case of the conventional manufacturing method in which the damper is affixed by being pressed against the surface of the load beam. Thus, deformation of the suspension 10, and hence degradation of its properties, can be prevented.

According to the manufacturing method of the present embodiment, moreover, the viscoelastic body 39 can be disposed in a predetermined position on the suspension 10 by using the recess 31 in the load beam 12.

The following is a description of the function of the suspension 10 constructed in this manner.

In the suspension 10 of the present embodiment, the viscoelastic body 39 is contained in the recess 31 of the load beam 12. Further, the lid portion 38 of the flexure 13 is superposed on the viscoelastic body 39 so as to cover the recess 31.

The viscoelastic body 39 adheres to the recess 31 and lid portion 38 and has elasticity and fluidity. If a force to cause the suspension 10 to vibrate is input, therefore, the viscoelastic body 39 is deformed as the vibrating load beam 12 and flexure 13 are deformed. If the viscoelastic body 39 is deformed, it produces an internal resistance based on molecular friction. Thus, the viscoelastic body 39 converts vibrational energy of the load beam 12 and flexure 13 into thermal energy.

Based on the action described above, the viscoelastic body 39 suppresses vibration of the suspension 10. Specifically, the load beam 12, flexure 13, and viscoelastic body 39 serve as vibration damping structures that cooperatively suppress vibration of the suspension 10. In this case, the flexure 13 functions as a constraint plate.

In the suspension 10 of the present embodiment, the flexure 13 can double as a constraint plate. Thus, the number of components of the suspension 10 can be reduced, so that an increase in mass of the suspension 10 can be minimized.

A second embodiment of the present invention will now be described with reference to FIG. 6.

Figure 6:
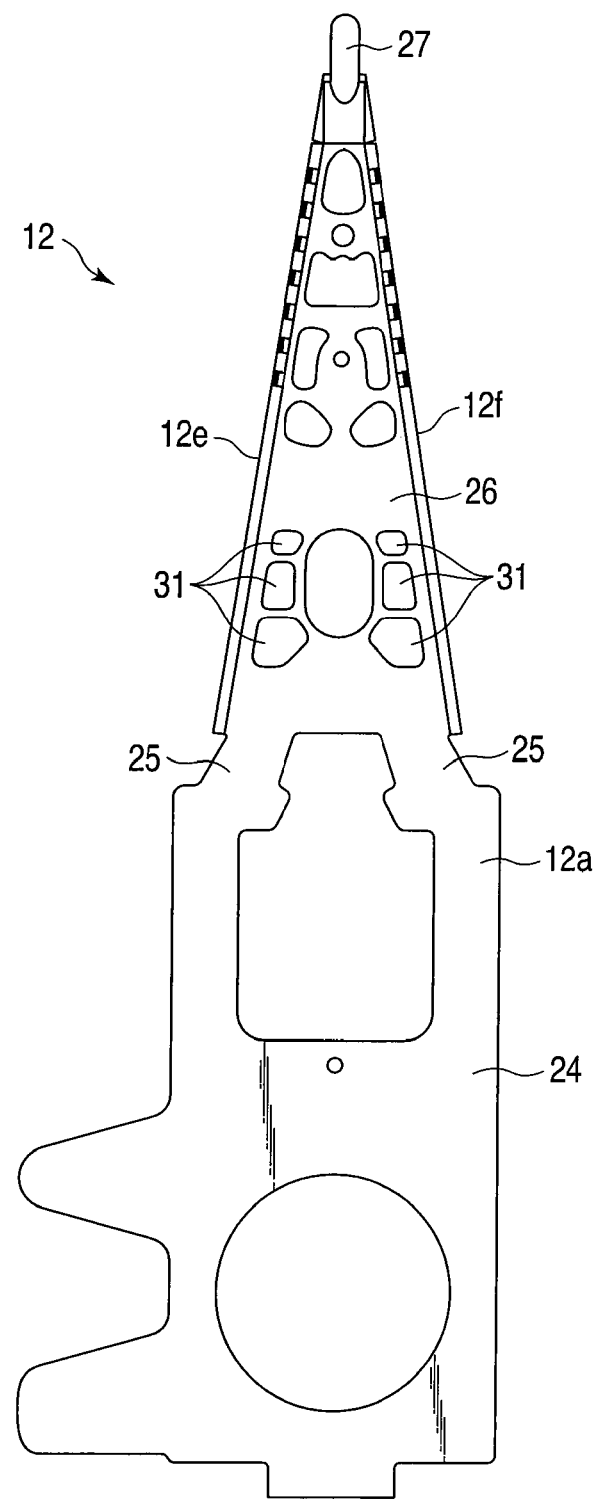
FIG. 6 is a plan view of a load beam according to a second embodiment of the invention.

FIG. 6 shows a load beam 12 according to the second embodiment. A plurality of recesses 31 are formed in one surface 12a of the load beam 12. A viscoelastic body 39 is contained in each of the recesses 31. Since configurations and functions other than those described above are common to the suspensions 10 of the first and second embodiments, like numbers are used to designate common portions of these two embodiments, and a description of those portions is omitted.

A third embodiment of the present invention will now be described with reference to FIG. 7.

Figure 7:
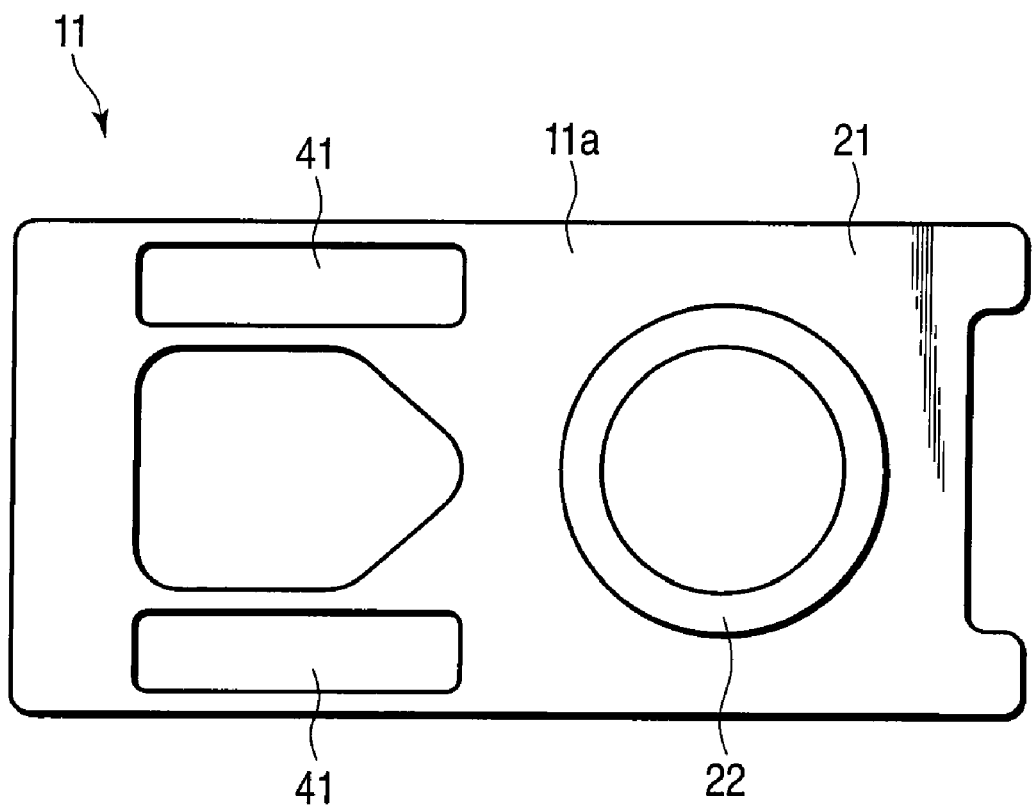
FIG. 7 is a plan view of a baseplate according to a third embodiment of the invention.

A plurality of recesses 41 are formed in one surface 11a of a plate portion 21 of a baseplate 11 shown in FIG. 7. The recesses 41 are formed by, for example, partial etching. Alternatively, the recesses 41 may be formed by coining. A viscoelastic body 39 is contained in each of the recesses 41.

In the present embodiment, a load beam 12 functions as a plate-like suspension constituent member according to the present invention. Specifically, the other surface 12b of the load beam 12 functions as a lid portion. The recesses 41 are covered at least partially by the other surface 12b so that a viscoelastic body 39 is held in position. Since configurations and functions other than those described above are common to the suspensions 10 of the first and third embodiments, like numbers are used to designate common portions of these two embodiments, and a description of those portions is omitted.

A fourth embodiment of the present invention will now be described with reference to FIG. 8.

Figure 8:
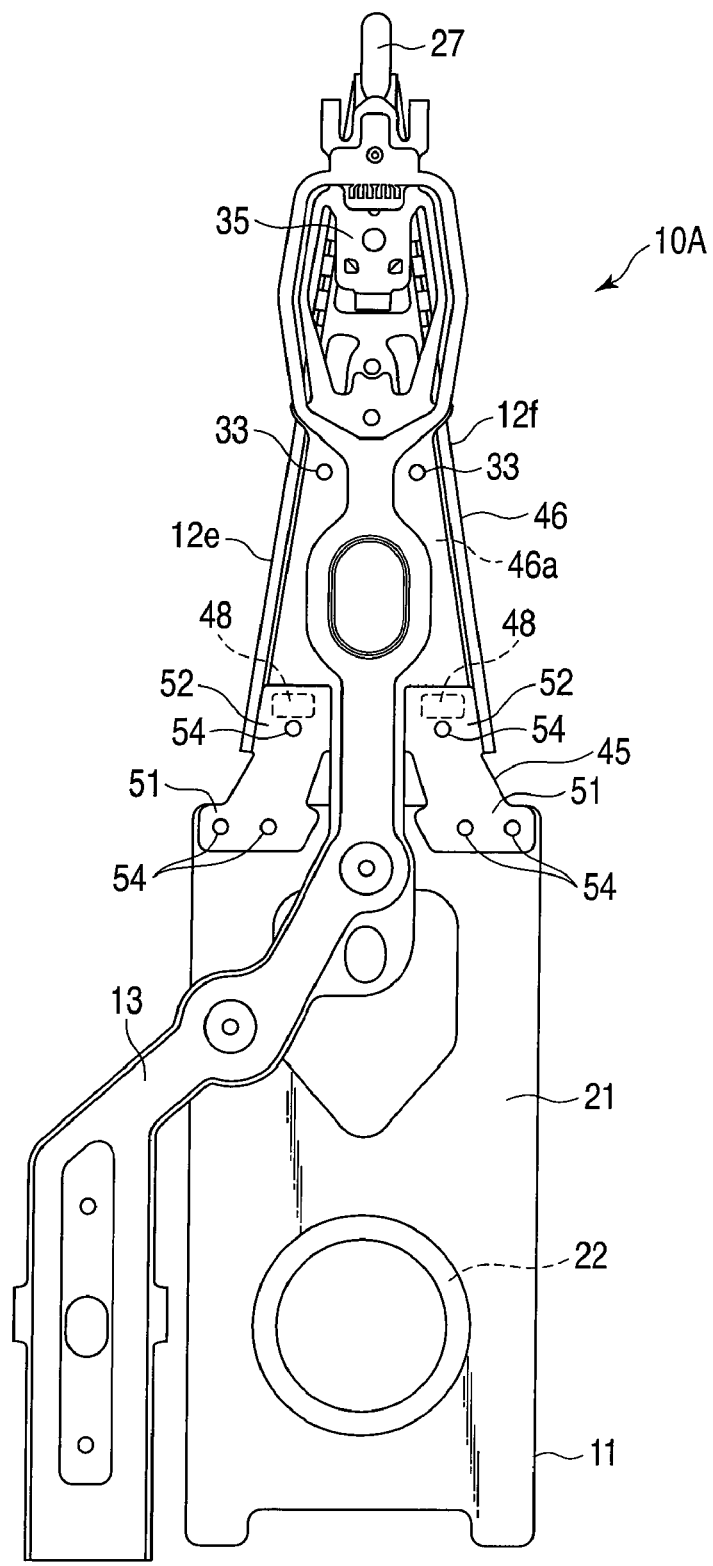
FIG. 8 is a plan view of a suspension according to a fourth embodiment of the invention.

FIG. 8 shows a suspension 10A according to the fourth embodiment. The suspension 10A comprises a baseplate 11, hinge portions 45, load beam 46, and flexure 13. The hinge portions 45 function as a plate-like suspension constituent member according to the present invention.

A plurality of recesses 48 are formed in one surface 46a of the load beam 46 relative to its thickness. In the present embodiment, the recesses 48 are located near the baseplate 11. A viscoelastic body 39 is contained in each of the recesses 48.

The hinge portions 45 are formed of a metal such as stainless steel. Each hinge portion 45 is about 25 to 50 µm thick. The hinge portions 45 are springy and bendable relative to their thickness. Each hinge portion 45 comprises first and second fixed portions 51 and 52.

The first fixed portion 51 is superposed on a part of the baseplate 11 and fixed to the baseplate 11 at a plurality of welded joints 54. The second fixed portion 52 is superposed on the one surface 46a of the load beam 46 so as to cover its corresponding recess 48. The second fixed portion 52 is fixed to the load beam 46 at the welded joints 54 by fixing means, such as laser welding.

That part of the second fixed portion 52 of each hinge portion 45 which corresponds to each recess 48 is used as a flat lid portion. At least a part of the recess 48 is covered by this lid portion so that a viscoelastic body 39 is held in position. Since configurations and functions other than those described above are common to the suspensions of the first and fourth embodiments, like numbers are used to designate common portions of these two embodiments, and a description of those portions is omitted.

It is to be understood, in carrying out the present invention, that the structures and arrangements of the constituent elements of the suspension, including the load beam, hinge portions, baseplate, recesses, and viscoelastic body, may be suitably modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
    a baseplate;
    a load beam;
    a flexure;
    a recess formed in one surface of the load beam relative to a thickness thereof;
    a damping material contained in the recess; and
    a lid portion formed by a part of the flexure superposed on the damping material so as to cover at least a part of the recess.

2. A disk drive suspension comprising:
    a baseplate;
    a load beam;
    a recess formed in one surface of the baseplate relative to a thickness thereof;
    a damping material contained in the recess; and
    a lid portion formed by a part of the load beam superposed on the damping material so as to cover at least a part of the recess.

3. A disk drive suspension comprising:
    a baseplate;
    a load beam;
    a hinge member;
    a recess formed in one surface of the load beam relative to a thickness thereof;
    a damping material contained in the recess; and
    a lid portion formed by a part of the hinge member superposed on the damping material so as to cover at least a part of the recess.

* * * * *